United States Patent
Dunn et al.

(10) Patent No.: US 12,517,843 B2
(45) Date of Patent: Jan. 6, 2026

(54) THIRD PARTY APPLICATIONS FOR A NETWORK-CAPABLE DOCKING STATION

(71) Applicant: Synaptics Incorporated, San Jose, CA (US)

(72) Inventors: David Dunn, Cambridge (GB); Christopher James Martin, Cambridge (GB); Ian Christopher Doidge, Cambridge (GB); Jeffrey Lukanc, San Jose, CA (US); Ganesha Tekkatte, San Jose, CA (US); XueXin Liu, San Jose, CA (US); Bradley C. Malemezian, Atlanta, GA (US); Mark E. Miller, Mission Viejo, CA (US)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 18/786,104

(22) Filed: Jul. 26, 2024

(65) Prior Publication Data

US 2024/0385971 A1    Nov. 21, 2024

Related U.S. Application Data

(63) Continuation-in-part of application No. 17/581,126, filed on Jan. 21, 2022, now Pat. No. 12,298,808.

(51) Int. Cl.
   *G06F 13/10* (2006.01)
   *G06F 1/16* (2006.01)

(52) U.S. Cl.
   CPC ............ *G06F 13/10* (2013.01); *G06F 1/1632* (2013.01)

(58) Field of Classification Search
   CPC .............................. G06F 13/10; G06F 1/1632
   See application file for complete search history.

(56) References Cited

U.S. PATENT DOCUMENTS

| 7,949,797 B2 | 5/2011 | Yan et al. |
| 8,904,051 B2 | 12/2014 | Lee et al. |

(Continued)

FOREIGN PATENT DOCUMENTS

| GB | 2486412 A | 6/2012 |
| GB | 2580364 A | 7/2020 |

OTHER PUBLICATIONS

Combined Search and Examination Report, dated May 30, 2023, from UK Patent Application No. GB2300785.9, pp. 1-8.

(Continued)

*Primary Examiner* — Henry Tsai
*Assistant Examiner* — Christopher A Daley
(74) *Attorney, Agent, or Firm* — Paradice & Li LLP

(57) ABSTRACT

A docking station operable in a plurality of modes is disclosed. An example method includes obtaining first data via a first interface of the docking station configured to couple the docking station to a computing device and second data via a second interface of the docking station configured to communicate with a network, responsive to operating in a first mode, obtaining third data via the second interface of the docking station, responsive to operating in a second mode, and selectively outputting the first and the second data, or the third data, to a display based on whether the docking station operates in the first or the second mode. The selectively outputting includes determining that the computing device is not coupled to the docking station, and in response, processing the third data by an application installed in a secure sandbox, and outputting the processed third data to the display.

20 Claims, 10 Drawing Sheets

(56) References Cited

U.S. PATENT DOCUMENTS

| | | |
|---|---|---|
| 8,990,469 B2 | 3/2015 | Benhard et al. |
| 10,025,748 B2 | 7/2018 | Chen et al. |
| 11,076,031 B2 | 7/2021 | Kim et al. |
| 11,360,534 B2 | 6/2022 | Decamp et al. |
| 11,746,657 B2 * | 9/2023 | Auduberteau ............ F01D 5/10 415/119 |
| 12,073,205 B2 * | 8/2024 | Tsang .................... G06F 21/602 |
| 12,298,808 B2 * | 5/2025 | Lukanc .................. G06F 1/266 |
| 2005/0146741 A1 | 7/2005 | Collier et al. |
| 2010/0188808 A1 | 7/2010 | Howarth et al. |
| 2014/0160667 A1 | 6/2014 | Van Velzen et al. |
| 2016/0195897 A1 | 7/2016 | Robinson et al. |
| 2020/0051190 A1 | 2/2020 | Kamen et al. |
| 2020/0218324 A1 * | 7/2020 | Decamp ................ G06F 1/3209 |
| 2020/0219036 A1 | 7/2020 | Decamp et al. |
| 2022/0062764 A1 | 3/2022 | Li |
| 2022/0210730 A1 | 6/2022 | Peng et al. |
| 2022/0327438 A1 | 10/2022 | Bach et al. |

OTHER PUBLICATIONS

EP Search Report dated Sep. 8, 2025, from EP Patent Application No. 25191834.8-1218 pp. 1-10.

\* cited by examiner

300

Obtain first data via a first interface of the docking station and second data via a second interface of the docking station, responsive to operating in a first mode of the plurality of modes, the first interface being configured to couple the docking station to a computing device and the second interface being configured to communicate with a network
310

Obtain third data via the second interface of the docking station, in lieu of the first interface, responsive to operating in a second mode of the plurality of modes
320

Selectively output the first data and the second data, or the third data, to a display based on whether the docking station operates in the first mode or the second mode
330

FIG. 3

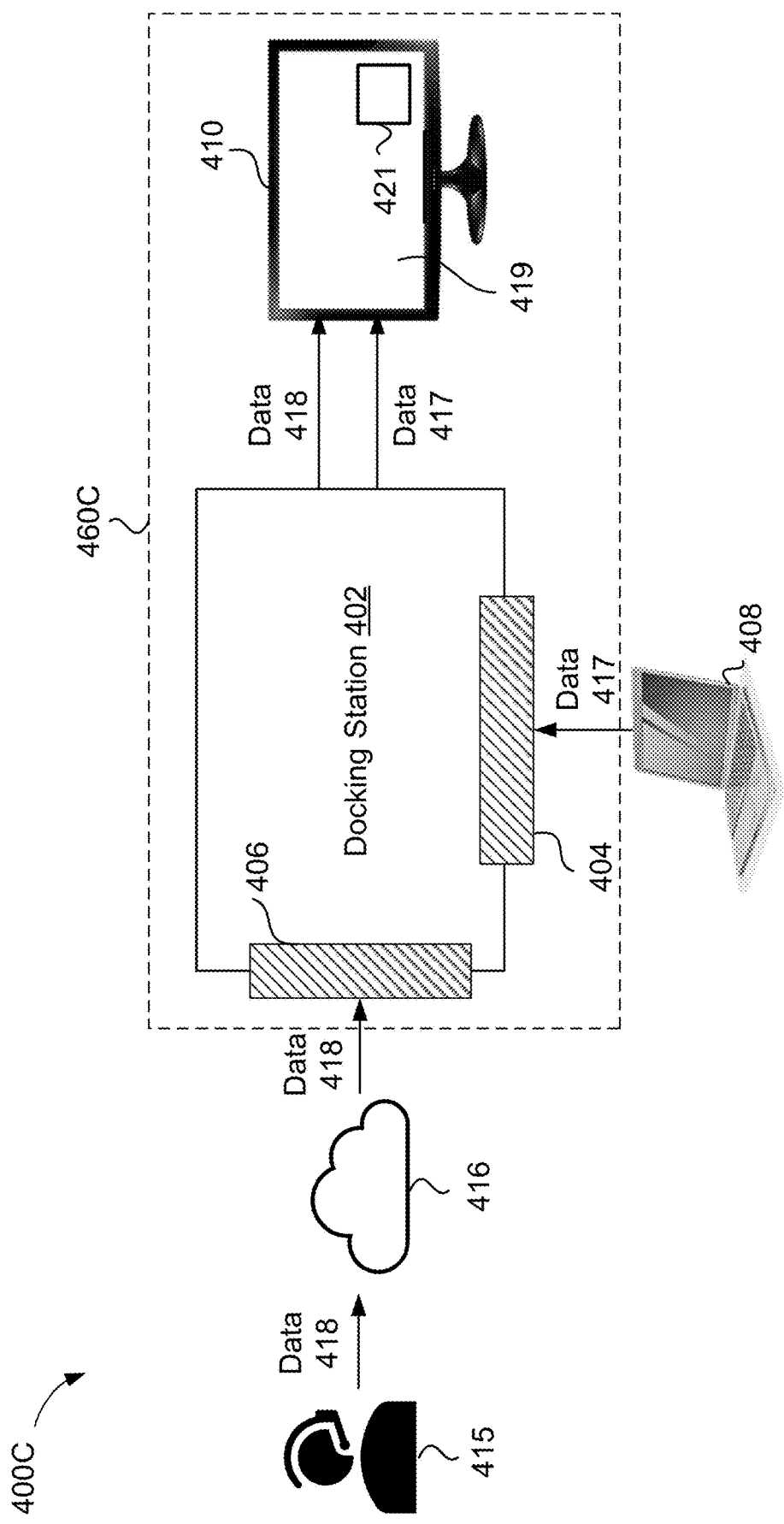

600 ⭨

```
┌─────────────────────────────────────────────────────────────────────┐
│ Obtain first data via a first interface of the docking station and  │
│ second data via a second interface of the docking station,          │
│ responsive to operating in a first mode of the plurality of modes,  │
│ the first interface being configured to couple the docking station  │
│ to a computing device and the second interface being configured to  │
│ communicate with a network                                          │
│                                 610                                 │
└─────────────────────────────────────────────────────────────────────┘
```

Obtain first data via a first interface of the docking station and second data via a second interface of the docking station, responsive to operating in a first mode of the plurality of modes, the first interface being configured to couple the docking station to a computing device and the second interface being configured to communicate with a network
610

↓

Obtain third data via the second interface of the docking station, in lieu of the first interface, responsive to operating in a second mode of the plurality of modes.
620

↓

Selectively output, to a display via a third interface of the docking station different from the first interface and the second interface, the first data and the second data in response to the docking station operating in the first mode, or the third data in response to the docking station operating in the second mode, wherein the selectively outputting further includes determining that the computing device is not coupled to the docking station, processing the third data by an application installed in a secure sandbox of the docking station, and operating in the second mode in response to determining that the computing device is not coupled to the docking station.
630

FIG. 6

THIRD PARTY APPLICATIONS FOR A NETWORK-CAPABLE DOCKING STATION

RELATED APPLICATIONS

This application is a continuation-in-part of U.S. patent application Ser. No. 17/581,126, filed Jan. 21, 2022, and entitled "Network-Capable Docking Station," the contents of which are incorporated by reference in their entirety.

TECHNICAL FIELD

The present implementations relate generally to docking stations, and specifically to a docking station configured to communicate with a network and to support various applications.

BACKGROUND OF RELATED ART

A docking station provides a simplified interface for coupling, or otherwise enabling, a computing device (such as a laptop) to communicate with various peripherals (e.g., monitors, a keyboard, mouse, and webcam) or other devices. However, existing docking stations have limited functionality when not connected to an external computing device. For example, to allow users to reserve a docking station in a public or communal space, the users would need to employ an existing hoteling application which may require non-standard, specialized hardware to be placed near the docking station. As another example, to run diagnostics on such a docking station, a site administrator (or information technology (IT) professional) would need to couple a computing device (such as a laptop) to the docking station.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented as a method performed by a docking station operable in a plurality of modes. An example method includes obtaining first data via a first interface of the docking station and second data via a second interface of the docking station in response to operating in a first mode of the plurality of modes. The first interface is configured to couple the docking station to a computing device and the second interface is configured to communicate with a network. The example method further includes obtaining third data via the second interface of the docking station, in lieu of the first interface, responsive to operating in a second mode of the plurality of modes, and selectively outputting, to a display via a third interface of the docking station different from the first interface and the second interface, the first data and the second data in response to the docking station operating in the first mode, or the third data in response to the docking station operating in the second mode. The selectively outputting further includes determining that the computing device is not coupled to the docking station, processing the third data by an application installed in a secure sandbox of the docking station, and operating in the second mode in response to determining that the computing device is not coupled to the docking station.

In some aspects, at least one of the second data or the third data indicates a reservation status associated with the docking station.

In some aspects, the secure sandbox is configured to store one or more replaceable applications for processing the third data.

In some aspects, processing the third data is performed by an application retrieved from the network and installed in the secure sandbox.

In some aspects, the method further includes retrieving an application update via the second interface for an application installed in the secure sandbox, updating the application with the retrieved application update, wherein processing the third data in the secure sandbox includes processing the third data using the updated application.

In some aspects, the third data is availability information for one or more external docking stations different from the docking station, processing the third data includes generating a user interface including the availability information for the one or more external docking stations, and outputting the third data to the display further includes presenting the user interface including the availability information for the one or more external docking stations.

In some aspects, the third data includes error information corresponding to a remote device coupled to the docking station.

In some aspects, the third data includes one or more advertisements. In some aspects, the one or more advertisements are retrieved via the second interface from the network and stored in the secure sandbox of the docking station.

In some aspects the third data includes one or more alerts for presentation on the display. In some aspects, the one or more alerts includes one or more emergency alerts pertaining to a building or a geographic location associated with the docking station.

In some aspects, presenting the first data and the second data in block 630 further includes processing the second data in the secure sandbox and presenting the processed second data in an overlay with the first data on the display.

Another innovative aspect of the subject matter of this disclosure can be implemented as a controller for a docking station operable in a plurality of modes. An example controller includes a processing system and a memory storing instructions for execution by the processing system. Execution of the instructions causes the controller to obtain first data via a first interface of the docking station and second data via a second interface of the docking station in response to operating in a first mode of the plurality of modes. The first interface is configured to couple the docking station to a computing device and the second interface is configured to communicate with a network. Execution of the instructions causes the controller to perform operations further including obtaining third data via the second interface of the docking station, in lieu of the first interface, responsive to operating in a second mode of the plurality of modes, and selectively outputting, to a display via a third interface of the docking station different from the first interface and the second interface, the first data and the second data in response to the docking station operating in the first mode, or the third data in response to the docking station operating in the second mode. The selectively outputting further includes determining that the computing device is not coupled to the docking station, processing the third data by an application installed in a secure sandbox of the docking station, and operating in the second mode in response to determining that the computing device is not coupled to the docking station.

Another innovative aspect of the subject matter of this disclosure can be implemented as a system including a display and a docking station coupled to the display, where the docking station is operable in a plurality of modes. An example docking station is configured to obtain first data via a first interface of the docking station and second data via a second interface of the docking station in response to operating in a first mode of the plurality of modes. The first interface is configured to couple the docking station to a computing device and the second interface is configured to communicate with a network. Execution of the instructions causes the controller to perform operations further including obtaining third data via the second interface of the docking station, in lieu of the first interface, responsive to operating in a second mode of the plurality of modes, and selectively outputting, to a display via a third interface of the docking station different from the first interface and the second interface, the first data and the second data in response to the docking station operating in the first mode, or the third data in response to the docking station operating in the second mode. The selectively outputting further includes determining that the computing device is not coupled to the docking station, processing the third data by an application installed in a secure sandbox of the docking station, and operating in the second mode in response to determining that the computing device is not coupled to the docking station.

BRIEF DESCRIPTION OF THE DRAWINGS

The present embodiments are illustrated by way of example and are not intended to be limited by the figures of the accompanying drawings.

FIG. 3 shows an illustrative flowchart depicting an example method performed by a docking station, in accordance with some embodiments.

FIG. 4C shows an example application of a docking station operating in a third mode, in accordance with some embodiments.

FIG. 6 shows an illustrative flowchart depicting an example method performed by a docking station, in accordance with some embodiments.

DETAILED DESCRIPTION

Figure 1A:
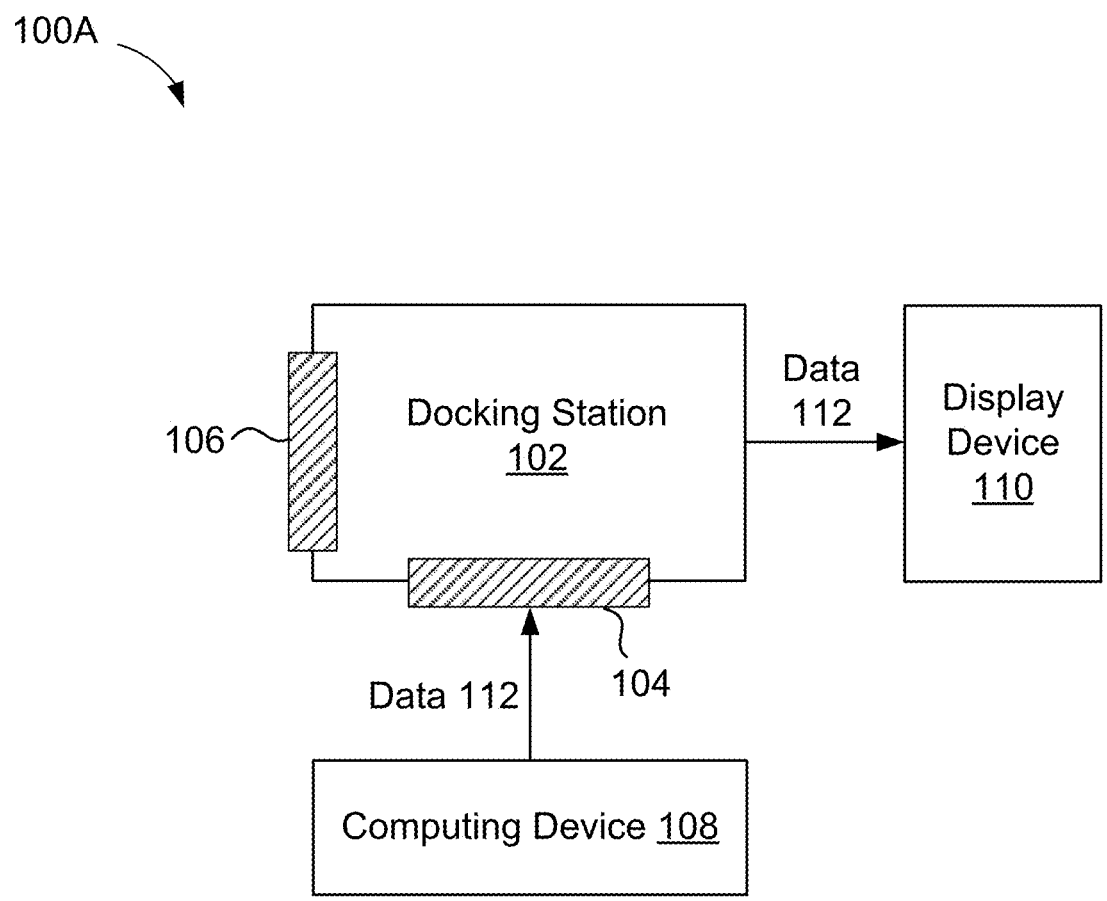
FIG. 1A shows a block diagram depicting an example configuration of a docking station, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. The terms "first," "second," "third," "fourth," etc., as used herein, are not intended to indicate any sequence, amount or importance, but rather to distinguish various components or configurations. The phrase "in lieu of," as used herein, means "as an alternative to," "rather than," or "instead of," and is not intended to indicate any sequence or order. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, perform one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Aspects of the disclosure relate to a docking station that is capable of communicating with a network. In some embodiments, the docking station may be operable in multiple modes (e.g., configurations), such as a first mode and a second mode. When operating in the first mode, the docking station may obtain data via a docking interface. The docking interface may be configured to couple the docking station to an external computing device such as a laptop, notebook, or tablet. When operating in the second mode, the docking station may obtain data via a network interface, instead of the docking interface. The network interface may be configured to communicate with a network such as a local area network (LAN), wide area network (WAN), the Internet, or a cloud network. Further, the docking station may output the data obtained via the docking interface or the network interface to a display, depending on whether the docking station operates in the first mode or the second mode.

By enabling docking stations to communicate with a network (such as when operating in the second mode), aspects of the present disclosure may support new features and applications for docking stations even when no external computing devices are coupled thereto. Example suitable applications may include hoteling applications, which are used to manage workspaces (e.g., desks, cubicles, and conference rooms), and/or equipment in the workspaces (e.g., a docking station connected to a network, monitor, keyboard, and mouse). For example, in a hoteling application, a docking station located in an office may (i) receive, via a network, a message indicating that the docking station is reserved for a particular user, and (ii) output the message to a display device. The docking station also may be configured to communicate with a manager or operator of the network, for example, to provide the network manager with information indicating (i) the operational health of the docking station, (ii) the operational health of one or more devices coupled to the docking station, and/or (iii) the environment near the docking station (e.g., the temperature or humidity of the office in which the docking station is located).

FIG. 1A shows a block diagram depicting an example configuration 100A of a docking station 102, in accordance with some embodiments. More specifically, FIG. 1A shows the docking station 102 in communication with a computing device 108 and a display device 110.

In some embodiments, the display device 110 may be a computer monitor, liquid crystal display (LCD), plasma display, cathode ray tube (CRT) display, light emitting diode (LED) display, organic light emitting diode (OLED) display, or any other type of display or visual interface configured to interface with the docking station 102. Further, the display device 110 may be configured to communicate with and/or receive power from the docking station 102.

In some aspects, the docking station 102 may include a docking interface 104 configured to dock (e.g., charge, provide power to, and/or communicate) with one or more electronic devices; and a network interface 106 configured to communicate with a network (not shown in FIG. 1A). The docking interface 104 may be configured to receive or otherwise couple to the computing device 108. In some embodiments, the docking interface 104 may communicate with the computing device 108 via a wired connection (such as USB-C or DisplayPort). In some other embodiments, the docking interface 104 may communicate with the computing device 108 via a wireless communication medium (such as in accordance with Wi-Fi, WiGig, Bluetooth, or various other wireless communication standards). In some embodiments, the computing device 108 may be a laptop, notebook, tablet, or other computing device configured to interface with the docking station 102. Further, the computing device 108 may be configured to communicate with and/or receive power from the docking station 102.

The network interface 106 may be configured to communicate with a network. In some embodiments, the network interface 106 may communicate with a network via a wired connection (such as Ethernet). In some other embodiments, the network interface 106 may communicate with the network via a wireless communication medium (such as in accordance with Wi-Fi or other wireless communication standards). While only two interfaces are shown in FIG. 1A for simplicity, the docking station 102 also includes an interface to receive or otherwise couple to the display device 110. Further, in some embodiments, the docking station 102 may include additional interfaces to receive or otherwise couple to other computing devices and/or peripherals.

As shown in FIG. 1A, when the docking station 102 operates in a first mode, the docking station 102 may obtain data 112 from the computing device 108 via the docking interface 104, and output the data 112 to the display device 110. For example, the data 112 may include text data, image data, and/or video data. In some embodiments, when operating in the first mode, the docking station 102 may output the data 112 to one or more display devices 110, and/or one or more peripherals (e.g., a keyboard, mouse, and/or webcam). Further, in some embodiments, when operating in the first mode, the docking station 102 may not output the data 112 to any display devices 110 and/or peripherals. In some embodiments, when operating in the first mode, the docking station 102 may transmit data from one or more display devices 110 and/or one or more peripherals to the computing device 108.

Figure 1B:
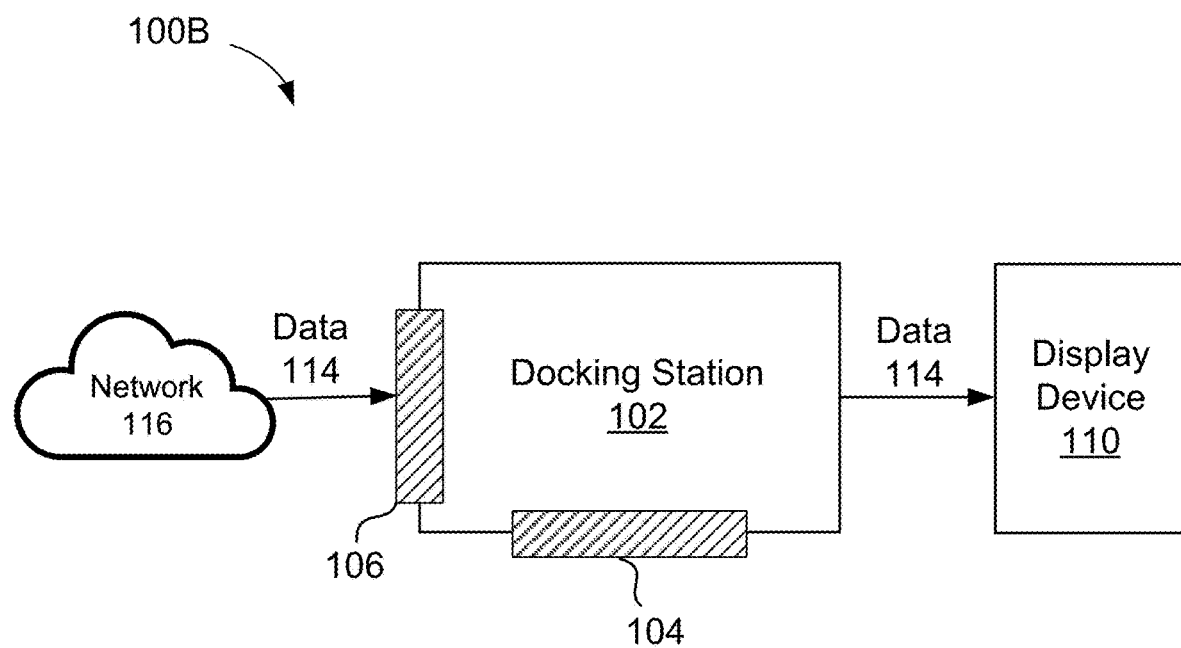
FIG. 1B shows a block diagram depicting an example configuration of a docking station, in accordance with some embodiments.

FIG. 1B shows a block diagram depicting an example configuration 100B of the docking station 102, in accordance with some embodiments. More specifically, FIG. 1B shows the docking station 102 in communication with a network 116 and the display device 110.

The network 116 may include a LAN, WAN, the Internet, a cloud network, private enterprise network, or other network suitable for interfacing with the docking station 102. In some embodiments, the network 116 may communicate with the docking station 102 via a wired connection (such as Ethernet). In some other embodiments, the network 116 may communicate with the docking station 102 via a wireless communication medium (such as in accordance with Wi-Fi or various other wireless communication standards).

As shown in FIG. 1B, when the docking station 102 operates in a second mode, the docking station 102 may obtain data 114 from the network 116 via the network interface 106, and output the data 114 to the display device 110. For example, the data 114 may include text data (e.g., ASCII text), image data (e.g., bitmap data), and/or video data. As another example, in some embodiments, the data 114 may include image data representing a logo and/or two-dimensional barcode (such as Quick Response (QR) code). In some embodiments, when operating in the second mode, the docking station 102 may output the data 114 to one or more display devices 110 and/or one or more peripherals. Further, in some embodiments, when operating in the second mode, the docking station 102 may not output the data 114 to any display devices 110 and/or peripherals. In some embodiments, when operating in the second mode, the docking station 102 may transmit data from one or more display devices 110 and/or one or more peripherals to the network 116.

Figure 1C:
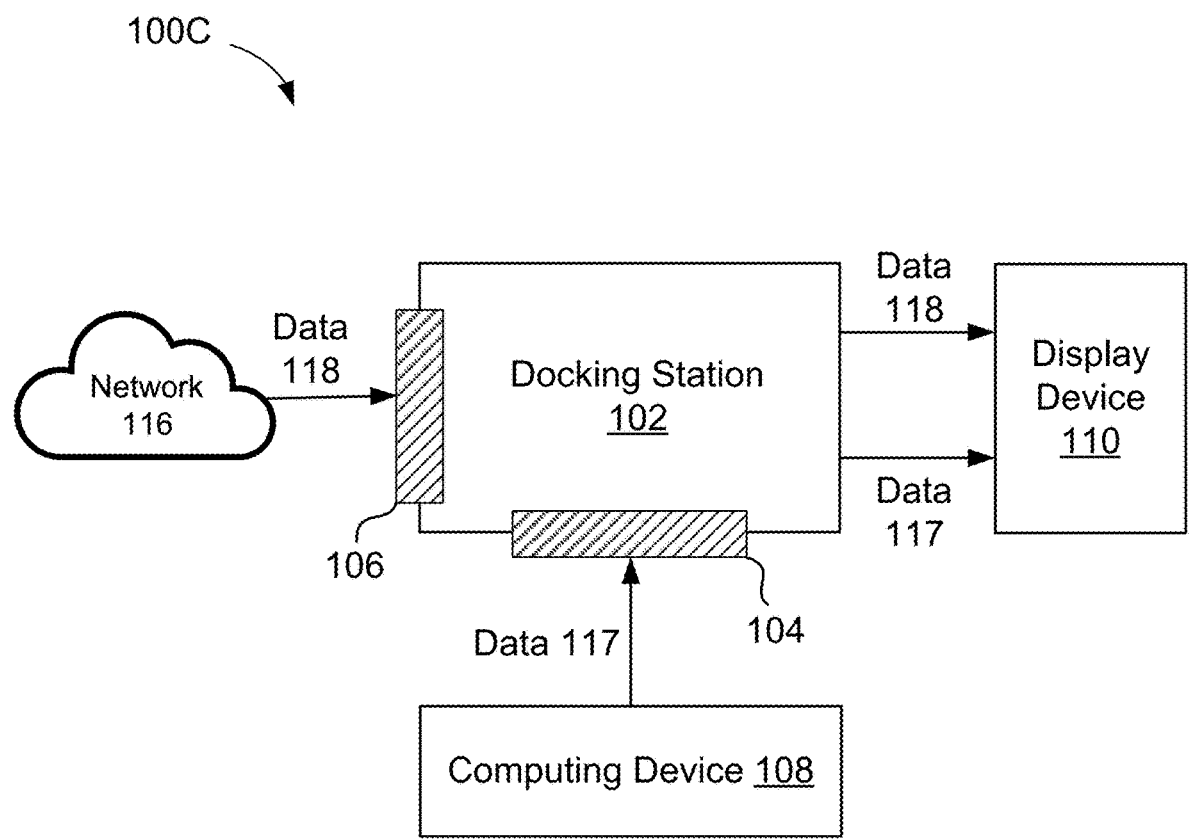
FIG. 1C shows a block diagram depicting an example configuration of a docking station, in accordance with some embodiments.

FIG. 1C shows a block diagram depicting an example configuration 100C of the docking station 102, in accordance with some embodiments. More specifically, FIG. 1C shows that, when operating in a third mode, the docking station 102 may receive data 117 and 118 from the computing device 108 and network 116, respectively, and output the data 117 and 118 to the display device 110. For example, the data 117 and/or 118 may include text data, image data, and/or video data. In some embodiments, when operating in the third mode, the docking station 102 may output the data 117 and/or 118 to one or more display devices 110, and/or one or more peripherals. For example, when operating in the third mode, the data 117 and 118 may be output to the display device 110 for display, where one of the data 117 or 118 is output as On-Screen Display (OSD) data that is overlayed on the other one. Further, in some embodiments, when operating in the third mode, the docking station 102 may not output the data 117 and/or 118 to any display devices 110 and/or peripherals. In some embodiments, when operating in the third mode, the docking station 102 may transmit data from one or more display devices 110 and/or one or more peripherals to the network 116 and/or the computing device 108. Further, in some embodiments, when operating in the third mode, the docking station 102 may transmit data from the computing device 108 to the network 116.

Figure 2:
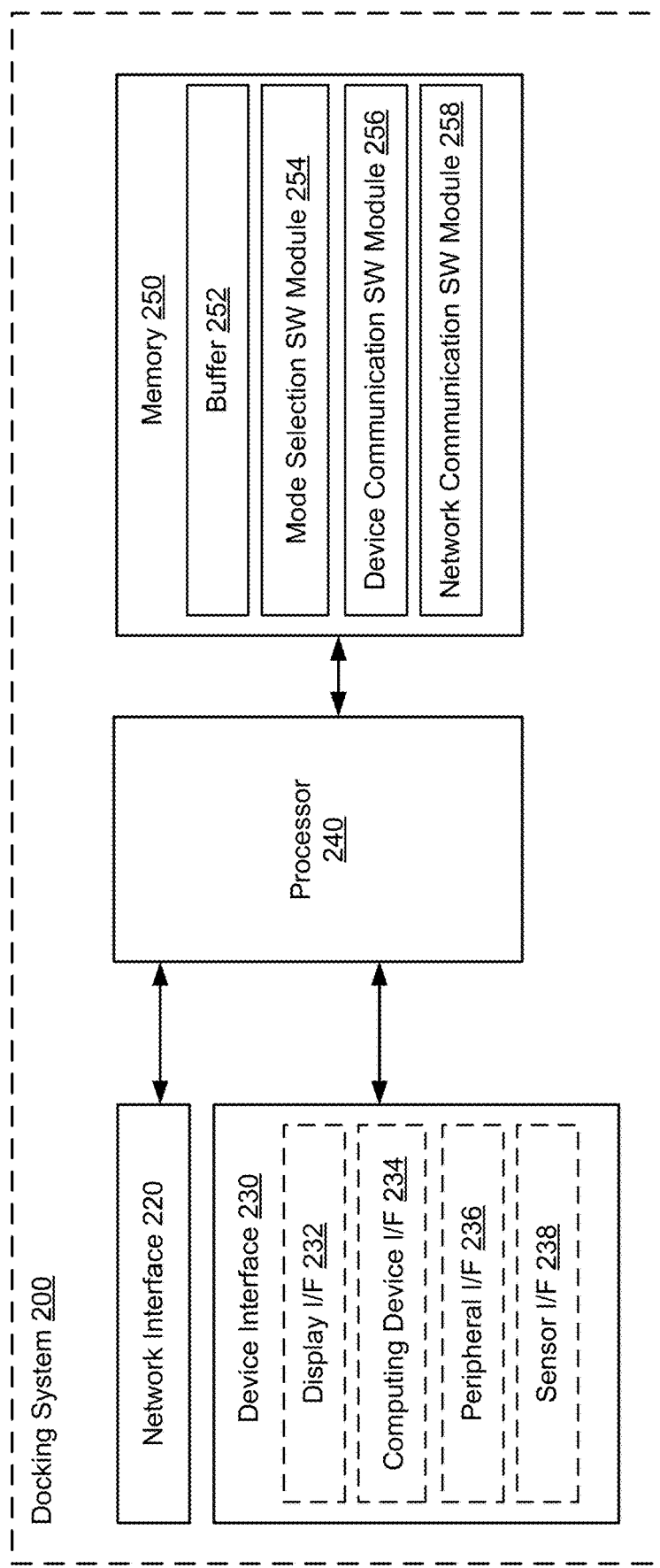
FIG. 2 shows a block diagram of a docking system, in accordance with some embodiments.

FIG. 2 shows a block diagram of a docking system 200 (also referred to as a "controller 200"), in accordance with some embodiments. The docking system 200 includes a network interface 220, a device interface 230, a processor 240, and a memory 250. For purposes of discussion herein, the processor 240 is shown in FIG. 2 as being coupled to the network interface 220, device interface 230, and memory 250. For actual embodiments, the network interface 220, device interface 230, processor 240, and/or memory 250 may be connected together using one or more buses (not shown for simplicity). It is noted that, in some embodiments, the docking system 200 may be an application specific integrated circuit (ASIC) (e.g., a microcontroller unit (MCU)) or other integrated circuit (IC) disposed on the docking station 102 described with reference to FIGS. 1A-1C. Moreover, in some embodiments, the docking system 200 may be a thin client.

The network interface 220 may transmit and receive signals to and from a network such as a LAN, WAN, the Internet, a cloud network, private enterprise network, or other network. In some aspects, the network interface 220 may be assigned a media access control (MAC) address to communicate with the network. The device interface 230 may transmit and receive signals to and from devices coupled to the docking system 200. In some embodiments, the device interface 230 may include display interface(s) 232, computing device interface(s) 234, peripheral interface(s) 236, and/or sensor interface(s) 238. The display interface 232 may be used to communicate with a display device and/or to provide a visual interface to a user of the docking system 200. The computing device interface 234 may be used to communicate with a computing device such as a laptop, notebook, or tablet. The peripheral interface 236 may be used to communicate with peripherals such as a mouse, keyboard, webcam, microphone, printer, headphones, speaker, data storage device, or game controller. The sensor interface 238 may be used to communicate with a sensor such as a thermometer, hygrometer, or other device that senses environmental conditions.

The memory 250 may include one or more buffers 252 to store data received from the network interface 220 and/or device interface 230, and to store data (including, for example text data (e.g., ASCII text), image data (e.g., bitmap data), and/or video data) generated by and/or received from the processor 240. For example, in one embodiment, at least one buffer 252 may be an overlay RAM configured to store OSD data including low-resolution text images. The memory 250 may also include a non-transitory computer-readable medium (e.g., one or more nonvolatile memory elements, such as EPROM, EEPROM, Flash memory, a hard drive, and so on) that may store at least the following software (SW) modules:

a mode (or configuration) selection SW module 254 to selectively switch an operation of the docking system 200 between a first mode, second mode, and third mode, based on the detection of a connection between the docking system 200 and (i) a computing device via the computing device interface 234, and/or (ii) a network via the network interface 220;

a device communication SW module 256 to communicate with and/or facilitate the provision of power to the device interface 230; and a network communication SW module 258 to communicate with the network interface 220.

Each SW module includes instructions that, when executed by the processor 240, cause the docking system 200 to perform the corresponding functions.

For example, in some embodiments, the processor 240 may execute the mode selection SW module 254 to select the first mode upon detecting that a computing device is docked to the docking system 200 via the computing device interface 234. In executing the mode selection SW module 254 to operate in the first mode, the processor 240 may obtain data from the computing device interface 234 and output the data to the display interface 232. In some embodiments, in executing the mode selection SW module 254 to operate in the first mode, the processor 240 may obtain data from the computing device interface 234 and output some or all of the data to one or more display interfaces 232, one or more peripheral interfaces 236 and/or one or more sensor interfaces 238. Further, in some embodiments, in executing the mode selection SW module 254 to operate in the first mode, the processor 240 may transmit data from one or more display interfaces 232, one or more peripheral interfaces 236, and/or one or more sensor interfaces 238, to the computing device interface 234.

As another example, in some embodiments, the processor 240 may execute the mode selection SW module 254 to select the second mode upon detecting that the docking system 200 is connected to a network via the network interface 220, but not connected to a computing device via the computing device interface 234. In executing the mode selection SW module 254 to operate in the second mode, the processor 240 may obtain data from the network interface 220 and output the data to the display interface 232. In some embodiments, in executing the mode selection SW module 254 to operate in the second mode, the processor 240 may obtain data from the network interface 220 and output some or all of the data to one or more display interfaces 232, one or more peripheral interfaces 236, and/or one or more sensor interfaces 238. Further, in some embodiments, in executing the mode selection SW module 254 to operate in the second mode, the processor 240 may transmit data from one or more display interfaces 232, one or more peripheral interfaces 236, and/or one or more sensor interfaces 238, to the network interface 220.

As another example, in some embodiments, the processor 240 may execute the mode selection SW module 254 to select a third mode upon detecting that the docking system 200 is connected to both (i) a computing device via the computing device interface 234, and (ii) a network via the network interface 220. In executing the mode selection SW module 254 to operate in the third mode, the processor 240 may obtain data from the computing device interface 234 and network interface 220 and output these data to the display interface 232. In some embodiments, in executing the mode selection SW module 254 to operate in the third mode, the processor 240 may obtain data from the computing device interface 234 and network interface 220, and output some or all of these data to one or more display interfaces 232, one or more peripheral interfaces 236, and/or one or more sensor interfaces 238. Further, in some embodiments, in executing the mode selection SW module 254 to operate in the third mode, the processor 240 may transmit data from one or more display interfaces 232, one or more peripheral interfaces 236, and/or one or more sensor interfaces 238, to the computing device interface 234 and/or network interface 220. Additionally, in some embodiments, in executing the mode selection SW module 254 to operate in the third mode, the processor 240 may transmit data between the network interface 220 and the computing device interface 234.

FIG. 3 shows an illustrative flowchart depicting an example method 300 performed by a docking station, in accordance with some embodiments. The method 300 may be performed by the docking station 102 of FIGS. 1A-1C or the docking system 200 of FIG. 2.

As an illustrative example, the method 300 may be performed by the docking station 102 of FIGS. 1A-1C, which is operable in a plurality of modes (e.g., configurations). The method 300 may include obtaining first data via a first interface of the docking station 102 and second data via a second interface of the docking station 102, responsive to operating in a first mode of the plurality of modes (310). It is noted that this first mode of the plurality of modes corresponds to the third mode depicted in FIG. 1C. The first interface may be configured to couple the docking station 102 to a computing device, and the second interface may be configured to communicate with a network.

The method 300 may also include obtaining third data via the second interface of the docking station 102, in lieu of (or as an alternative to) the first interface, responsive to operating in a second mode of the plurality of modes (320).

The method 300 may also include selectively outputting the first data and the second data, or the third data, to a display based on whether the docking station 102 operates in the first mode or the second mode (330).

Figure 4A:
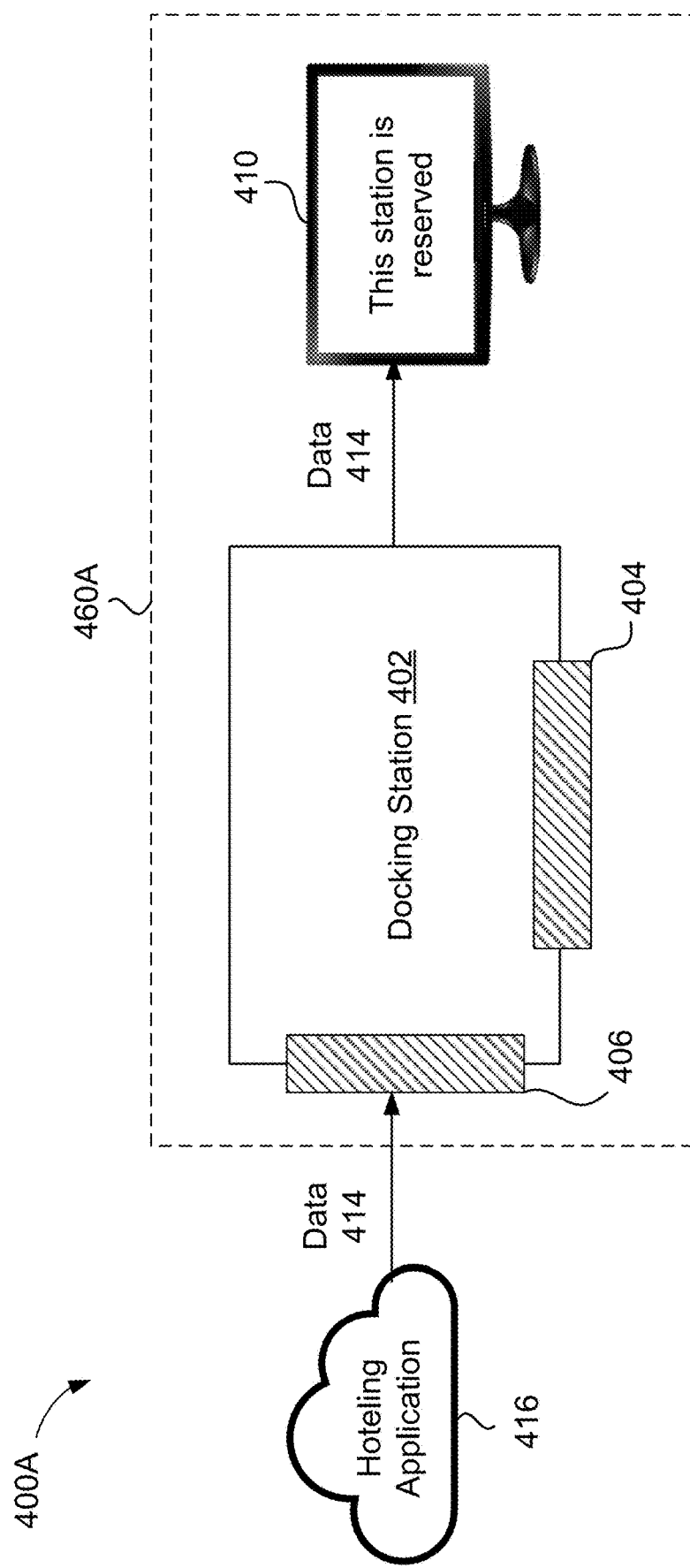
FIG. 4A shows an example application of a docking station operating in a second mode, in accordance with some embodiments.

FIG. 4A shows an example application 400A of a docking station 402 operating in a second mode, in accordance with some embodiments. The docking station 402 may be an embodiment of the docking station 102 of FIGS. 1A-1C or the docking system 200 of FIG. 2. As shown in FIG. 4A, the application 400A involves a network 416 and the station 460A, which includes the docking station 402 and a monitor 410. The network 416 and monitor 410 may be embodiments of the network 116 and display device 110, respectively, of FIG. 1B.

As an illustrative example, Company X may have an office that includes multiple stations, such as the station 460A, which provides a desktop computing environment for Company X's employees to use. In some embodiments, the station 460A may include additional monitors 410 and/or one or more peripherals. Company X's employees may have a flexible work schedule that allows them to work at the office two days per week and work from home three days per week. Prior to going to the office, each of Company X's employees may use a hoteling application to reserve a particular station at the office for use during one or more periods of time.

One Monday evening, from home, Company's X's employee, Employee Y, may use their company-issued laptop to access the hoteling application in network 416. Employee Y may use the hoteling application to reserve the station 460A for the next two days (Tuesday and Wednesday), when Employee Y plans to work at the office. In some embodiments, the hoteling application may notify Company X's cleaning team of the reservation, and the cleaning team may subsequently clean the station 460A.

Further, in some embodiments, the docking station 402 may obtain data 414 from the hoteling application in the network 416 via a network interface 406. The data 414 may include information associated the Employee Y's reservation such as the employee's name, the particular station reserved, the date and time of the reservation, and/or the status of the reservation (e.g., whether the reservation is active or canceled). The docking station 402 may then output some or all of data 414 to the monitor 410 for display. For example, as shown in FIG. 4A, the monitor 410 may display the message, "This station is reserved," to notify individuals (other than Employee Y) who walk by the station 460A early Tuesday morning, for example, that the station 460A is reserved and not available for use. In some embodiments, the message displayed may further communicate to such individuals that they should not approach and/or touch the station 460A in order to maintain the cleanliness of the station 460A. Further, in some embodiments, the message may continue to be displayed until Employee Y arrives at the office and couples their company-issued laptop with the station 460A. The message may also be displayed when Employee Y steps away from the station 460A during the reserved time period(s). In some aspects, user presence detection may be used for determining when the employee Y steps away from the station 460A during the reserved time period. For example, user presence may be detected based on input received from one or more peripherals or input devices coupled to the station 460A, such as based on input from a camera, microphone, keyboard, or other devices capable of detecting user input or presence. In response to detecting a lack of presence of the employee Y one or more power saving operations may be performed, such as turning off the monitor 410, or one or more security operations may be performed, such as locking an operating system of the laptop. Alternatively, if the employee Y decouples their laptop from the station 460A, then user presence detection may be used for determining that the station 460A is now available, and may transmit an indication, for example to the hoteling application in the network 416 via the network interface 406, to indicate that the station 460A is now available for another employee to reserve.

Accordingly, the docking station 402 provides a number of advantages. Because the docking station 402 communicates with the network 416, the docking station 402 supports the hoteling application by obtaining and outputting the message concerning the reservation to the monitor 410. Moreover, because the docking station 402 outputs the message concerning the reservation to the monitor 410 for display, the docking station 402 communicates information that may help keep station 460A clean and safe for Employee Y to use, which is especially important, for example, during a pandemic. Further, while some existing hoteling solutions require non-standard, special-purpose hardware, the docking station 402 obviates the need for such hardware.

While not shown in FIG. 4A, in some embodiments, the docking station 402 may include one or more LEDs and/or displays configured to communicate information associated with the docking station 402. For example, the information may relate to a reservation of the station 460A, the operational health of (e.g., diagnostic information associated with) the docking station 402, or information obtained from sensors or peripherals coupled to the docking station 402. Further, in many common office configurations, docking stations may have a one to one correspondence with the desk on which the docking station is deployed or located. Consequently, when the station 460A is available for reservation, a corresponding desk may also be available for reservation. A user or employee may therefore reserve the station 460A together with the corresponding desk, and the information may also relate to the reservation of this desk. Moreover, in some embodiments, when the station 460A is available for a reservation (e.g., not in use or out of service), the docking station 402 may output a message to the monitor 410 for display, indicating that the station 460A is available for reservation. Because such information may also be useful to the hoteling application, such as in the network 416, when the station 460A is available for reservation a message indicating this availability may be sent to the hoteling application via the network interface 406.

Figure 4B:
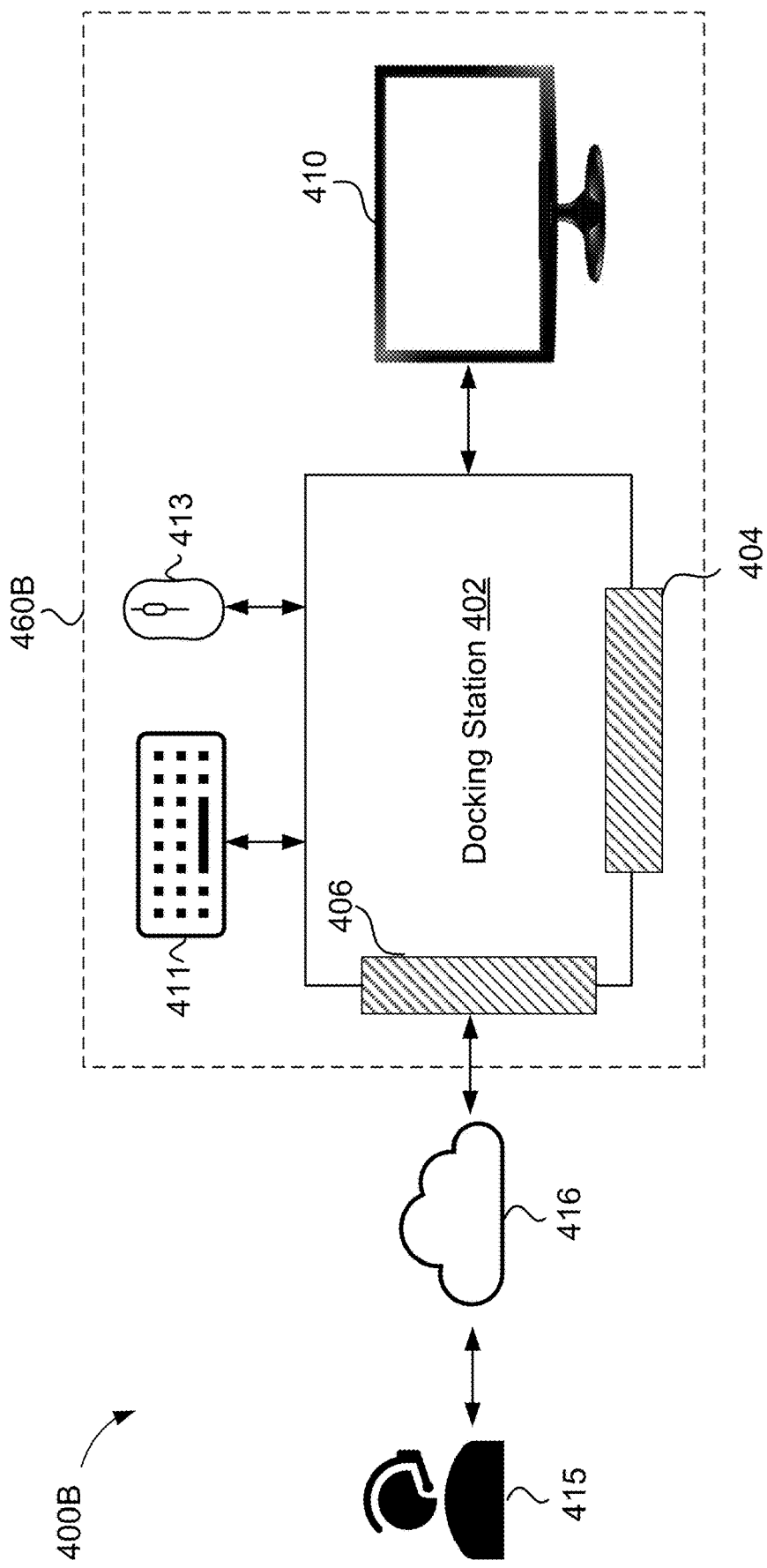
FIG. 4B shows an example application of a docking station operating in a second mode, in accordance with some embodiments.

FIG. 4B shows an example application 400B of the docking station 402 operating in the second mode, in accordance with some embodiments. As shown in FIG. 4B, the application 400B involves an IT professional 415, the network 416, and a station 460B, which includes the docking station 402, the monitor 410, a keyboard 411, and a mouse 413. The station 460B may be an embodiment of the station 460A of FIG. 4A.

Continuing with the example of FIG. 4A, Monday evening, after Employee Y reserves the station 460A of FIG. 4A (or station 460B of FIG. 4B), the IT professional 415 (who works for Company X) may communicate, via the network 416, with docking station 402 to determine the operational health of (i) the docking station 402 and/or (ii) one or more devices coupled to the docking station 402. In some embodiments, the docking station 402 may communicate with the keyboard 411, mouse 413, and/or monitor 410 to determine the operational health of one or more of these devices. The docking station 402 may determine, for example, that each of the keyboard 411, mouse 413, and monitor 410 is powered on, and that the mouse 413 needs a firmware update. The docking station may subsequently communicate this determination to the IT professional 415 via the network 416. In some embodiments, the IT professional 415 may then facilitate remotely, via the network 416 and docking station 402, the transfer and installation of the firmware update to the mouse 413. Accordingly, when the docking station 402 operates in the second mode, the docking station 402 may support remote monitoring and maintenance of the docking station 402 and devices coupled to the docking station 402. In an alternate embodiment and as discussed below, an application installed in a secure sandbox of the docking station 402 may automatically facilitate transfer and install the firmware update to the mouse 413. For example, manufacturers or retailers of peripheral devices such as the mouse 413 may provide such applications for installation in the secure sandbox, and such applications may receive notifications via the network 416 when updated firmware is available, or the application may periodically request such information from a remote computing device via the network 416.

While not shown in FIG. 4B, in some embodiments, the docking station 402 may be coupled to one or more sensors such as a thermometer and/or hygrometer used to sense environmental conditions near the docking station 402. In some embodiments, the docking station 402 may be configured to transmit information from these sensors to the IT professional 415 via the network 416. Moreover, in some embodiments, when the station 460B is not available for reservation due to, for example, a technical issue with the docking station 402 or one or more peripherals coupled to the docking station 402, the docking station 402 may output a message to the monitor 410 for display, indicating that the station 460B is out of service and not available for reservation.

FIG. 4C shows an example application 400C of the docking station 402 operating in a third mode, in accordance with some embodiments. As shown in FIG. 4C, the application 400C involves the IT professional 415, the network 416, a laptop 408, and a station 460C, which includes the docking station 402, and the monitor 410. The station 460C may be an embodiment of the station 460A or 460B in FIGS. 4A and 4B, respectively. The laptop 408 may be an embodiment of the computing device 108 in FIGS. 1A and 1C. In some embodiments, the station 460C may include additional devices, such as a second monitor 410, keyboard, and mouse.

Continuing with the example of FIGS. 4A and 4B, Tuesday morning, Employee Y may arrive at the office and walk to station 460A of FIG. 4A (or station 460C of FIG. 4C), where Employee Y plans to work. While at the station 460C, Employee Y may dock Employee Y's company-issued laptop 408 with the docking station 402 via a docking interface 404. The docking station 402 may then obtain data 417 (e.g., text data, image data, and/or video data) from the laptop 408 and output the data 417 to the monitor 410 for display. In an alternate implementation, and as discussed in more detail below, one or more applications installed in a secure sandbox of the docking station may aid Employee Y in enforcing their reservation of station 460A. For example, such an application may prevent another employee who has not reserved the station 460A from coupling their laptop to the station 460A. In other words, such an application may prevent an employee who has not reserved the station 460A during a specified time period from using the station 460A during that time period. For example, an application may prevent the unauthorized employee from accessing the network 416 using the station 460A, may prevent the unauthorized employee from logging in to the station 460A, may prevent the unauthorized employee from accessing one or more peripherals coupled to the station 460A, and so on, in order to reserve the station 460A for Employee Y during the reserved time period.

While Employee Y works at the station 460C, the IT professional 415 may communicate with the docking station 402, via the network 416, to determine the operational health of the laptop 408. The docking station 402 may then communicate with the laptop 408 and determine that the laptop 408 needs a software update. In some embodiments, the docking station 402 may then communicate this determination to the IT professional 415. Further, in some embodiments, the docking station 402 may obtain, from the IT professional 415, data 418 via the network 416. The data 418 may include information directed to Employee Y concerning the software update, such as a request for Employee Y to specify a time for the software update to be installed. The docking station 402 may then output some or all of data 418, including the request, to the monitor 410 for display in window 421. In some embodiments, the window 421 may be overlayed on the data 417 displayed on the monitor 410. Employee Y may then view some or all of data 418, including the request, in window 421.

In some embodiments, Employee Y may respond to the request by, for example, using the laptop 408 to send a message to the IT professional 415 (via the docking station 402 and network 416), indicating that Employee Y would like for the software update to be installed on the laptop 408 later that day at 4 PM. At 4 PM, the IT professional 415 may facilitate remotely, via the network 416 and docking station 402, the transfer and installation of the software update to the laptop 408. Accordingly, when the docking station 402 operates in the third mode, the docking station 402 permits the IT professional 415 to monitor and/or maintain the operational health of Employee Y's laptop 408, and to communicate with Employee Y.

In conventional docking stations, changes in docking station features or behavior require the deployment of new firmware for installation on the docking station. Further, in conventional docking stations customization is difficult, such that enabling multiple distinct behaviors may require very complex firmware, or multiple versions of docking station firmware to be developed, deployed, and maintained. Additionally, customers, meaning docking station owners or end users, cannot easily or quickly enable new functions for docking stations, for example to more effectively integrate with the customer's corporate environment or branding, or to update docking station behavior to match changes to the customer's corporate environment or branding. Instead, customers must request changes to be made by the docking station manufacturer. It would therefore be desirable to enable docking station owners and end users to update docking station functionality and behavior more quickly and easily without requiring manufacturer intervention.

Aspects of the present disclosure allow docking station owners or end users to customize docking station functionality by providing for the deployment and execution of customized applications within docking stations. More particularly, aspects may relate to the provision of application storage within a docking station, such as the provision of a secure sandbox within a docking station. A "secure sandbox" may refer to memory where applications may be stored and executed in a restricted operating system environment, where resources such as file descriptors, memory, file system space, network access, and various accesses to the host system (i.e., the docking station) are restricted. Such secure sandboxes may allow users to deploy software in a controlled environment in order to mitigate security risks and to prevent unauthorized accesses to the docking station or to other devices coupled to the docking station.

Providing a secure sandbox within a docking station may allow users and owners of the docking station to deploy a variety of software applications for customizing use of the docking station. For example, persons other than the manufacturer of the docking station, referred to herein as "third parties," may customize the docking station for their own uses, or provide a variety of applications to expand the functionality of the docking station, may deploy software updates to such applications, and so on. Such applications may perform a variety of functions, such as processing data retrieved from the network via the second interface, displaying information while no computing device is coupled to the dock (e.g., via the first interface), gathering information from one or more sensors or peripherals coupled to the docking station and displaying such information on the display or transmitting it to a remote computing device over the network, providing docking station status or reservation information on the display, providing notifications on the display regardless of whether a computing device is docked, such as emergency information, and so on. The provision of such a secure sandbox in example docking stations may expand the functionality of docking stations, allow owners of such docking stations to customize their function, such as customizing them for a particular environment, and so on.

Figure 5:
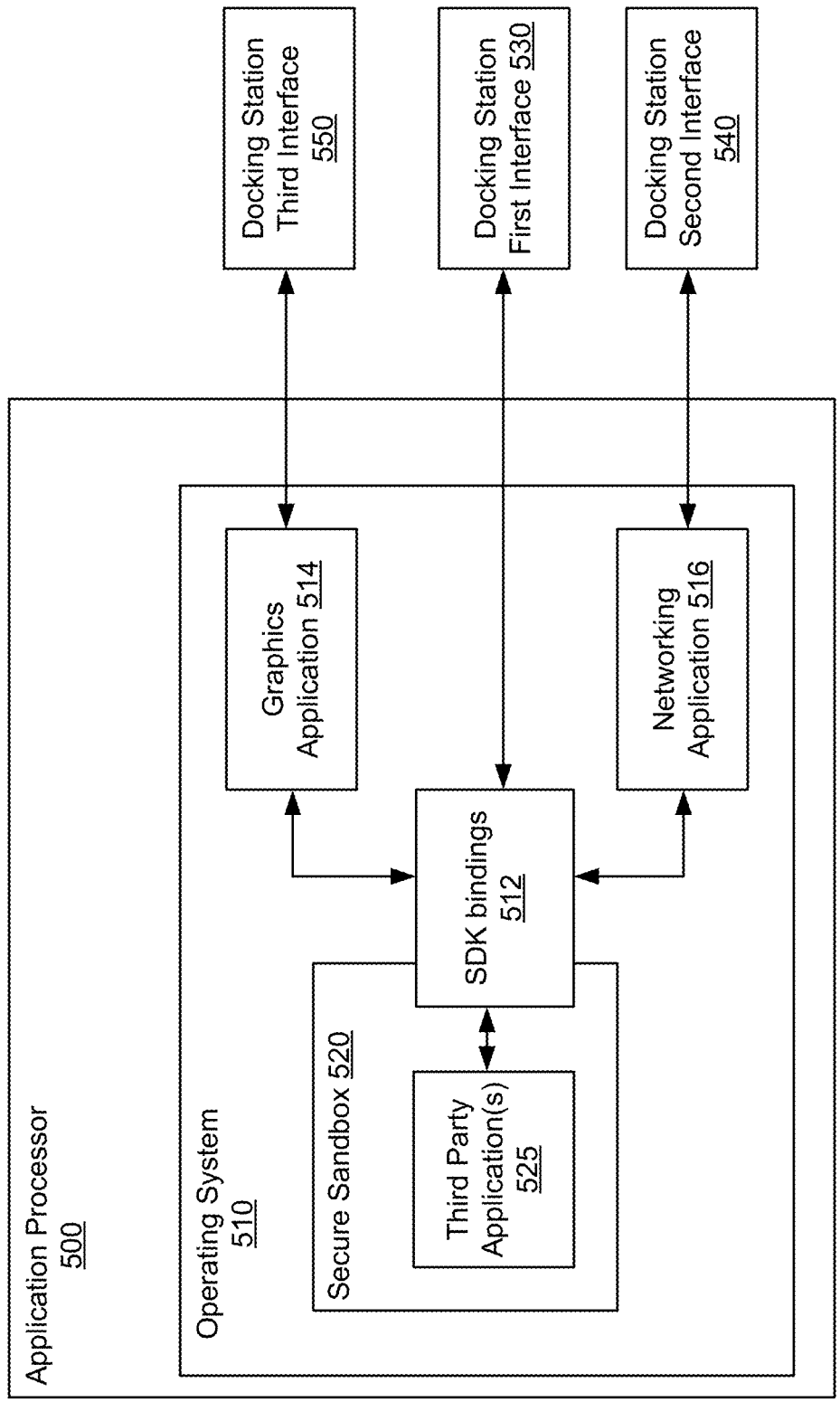
FIG. 5 shows a simplified block diagram of an example application processor for a docking station, according to some implementations.

FIG. 5 shows a simplified block diagram of an example application processor 500 for a docking station, according to some implementations. The application processor 500 may be implemented within a docking station according to the example implementations, such as the docking station 102 of FIGS. 1A-1C or the docking station 402 of FIGS. 4A-4C. In some example implementations, the application processor 500 may be implemented as one or more integrated circuits such as a system on chip (SoC), one or more programmable logic devices, one or more application-specific integrated circuits (ASICs), one or more field-programmable gate arrays (FPGAs), and so on. In some other implementations, the functions of the application processor 500 may be provided by instructions executed by the processor 240 of the docking system 200 of FIG. 2, such as instructions stored in the memory 250.

The application processor 500 may include an operating system 510, such as an embedded operating system, a secure sandbox 520 storing one or more third party applications 525, software development kit (SDK) bindings 512, a graphics application 514, and a networking application 516. The application processor 500 is shown to be coupled to a docking station first interface 530, a docking station second interface 540, and a docking station third interface 550.

The operating system 510 may be any suitable operating system capable of implementation by the application processor 500. In some implementations, the operating system 510 may be an embedded operating system, such as Embedded Linux, OpenHarmony, BusyBox, Oniro OS, HarmonyOS, NetBSD, Px5 RTOS, ThreadX, FreeRTOS, or another suitable embedded operating system.

The operating system 510 may provide access to a secure sandbox 520 accessible to the docking station via an SDK. For example, the secure sandbox 520 may store one or more third party applications 525 which are accessible to the docking station via SDK bindings 512. The SDK bindings 512 may provide the third party applications 525 with controlled access to functions of the docking station, peripherals coupled to the docking station, users of the docking station, network interfaces, third party protocols such as System Center Configuration Manage (SCCM), and so on. The SDK bindings 512 may also expose programming features and convenience functions to aid development of the third party applications 525. The SDK bindings 512 may also enable third party applications 525 to register for events such as when a computing device couples to the docking station via the first interface, loss of internet connectivity, and so on. Further, the SDK bindings 512 may enable the third party applications to communicate with a variety of generic hardware by supporting one or more hardware interfaces such as I2C, general purpose input/output (GPIO), Peripheral Component Interconnect Express (PCIE), universal serial bus (USB), and so on.

In some access, there may be multiple layers of access to the SDK, providing differing levels of restrictions on access to the functions of the docking station enabled to applications installed in the secure sandbox. In some examples, the level of access to the SDK may be configured differently, such as being configured in a factory setting or another setting prior to deployment of the docking station, depending on the docking station's security context. As an example, such restrictions may relate to allowed access to networking functions, so that increased restrictions may limit the degree of access to the network which is allowed to applications in the secure sandbox. Such differing levels of access may allow the SDK bindings 512 to be tailored to the context of the location or setting where the docking station is deployed. For example, docking stations deployed in a secure location or organizational environment, such as in a governmental organization, may require higher degrees of security, and more restrictions on the accesses allowed by the SDK, as compared to conventional settings, such as conventional commercial settings, where the docking station may be deployed. In some examples, the levels of access to the SDK may be numbered, such as being numbered from one to five, where lower numbered levels of access correspond to increased restrictions on access to the docking station allowed to applications executing in the secure sandbox.

Providing access to the secure sandbox using the SDK bindings 512 may allow third party applications 525 to access a variety of data and devices and interfaces of the docking station while preventing them from uncontrolled access to the docking station and to devices coupled to the docking station. This may allow for the development and implementation of a wide variety of applications within the secure sandbox 520 while preventing accesses which may be deemed to be security risks, such as risking harm to the operating system 510, to the docking station, to a computing device coupled to the docking station, to one or more networks coupled to the docking station, and so on.

The SDK bindings 512 may couple the secure sandbox 520 to a graphics application 514 coupled to the third interface 550 of the docking station. The graphics application 514 may be configured to provide graphical output to a display coupled to the third interface 550. The SDK bindings 512 may also couple the secure sandbox 520 to a networking application 516 coupled to a second interface 540 of the docking station. The networking application 516 may be configured to obtain data from or provide data to the network coupled to the second interface 540. The SDK bindings 512 may also couple the secure sandbox 520 to a first interface 530 of the docking station configured to couple the docking station to a computing device. By coupling the SDK bindings 512 to the first interface 530, the third party applications 525 may be capable of exchanging data with a computing device which is coupled to the docking station via the first interface 530. The SDK bindings 512 may also optionally couple the secure sandbox 520 to one or more peripherals, sensors, hardware interfaces, and so on of or coupled to the docking station, enabling the third party applications 525 access to such peripherals, sensors, and interfaces via the SDK bindings.

As discussed above, providing a memory space within a docking station, such as a secure sandbox, where replaceable applications may be stored and executed may allow users of the docking station to customize the docking station's functionality, and to update the functionality of the docking station much more quickly and easily than requiring the manufacturer of the docking station to issue new firmware. Further, providing access to the secure sandbox via SDK bindings may allow for ease of development, deployment, and updating of such applications while maintaining the security of the docking station by limiting the scope of access that the SDK allows to the docking station and to peripherals, computing devices, and networks coupled to the docking station.

In some aspects, applications for deployment to the secure sandbox may be developed by an end user of the docking station and deployed directly to the docking station. In some other aspects, such applications may be developed by a manufacturer of the docking station and deployed to the secure sandbox in a factory setting prior to sale of the docking station. In further aspects, a user of the docking station may develop applications using an emulator or similar software associated with the SDK to enable developers to create applications without the use of the docking station hardware, then to transfer completed applications to the docking station for deployment. In some aspects, the completed applications may be transferred to the docking station via a suitable I/O interface, such as USB or another suitable interface, and may be transferred to the docking station either before sale, by a manufacturer of the docking station, or after sale, by a purchaser of the docking station. In yet further aspects, developers of applications for deployment to a secure sandbox of a docking station may provide such applications for download via an application store accessible to the docking station via a network. For example, a docking station may contain an application which is configured to access the application store over the network, such as via the second interface 540 of the docking station. Users of the docking station may then, optionally, purchase such applications from the application store and download them to the docking station for deployment.

In some aspects, updates to applications deployed to the secure sandbox may be installed locally, such as via an interface such as USB. In some other aspects, updates to the applications may be retrieved from the network, such as via the second interface 540. In some aspects, updates for applications retrieved from the application store may also be retrieved from the application store over the network.

As discussed above, in some aspects, when no computing device is coupled to an example docking station, the docking station may display, for example, reservation status information about the docking station. In some aspects, executing an application stored in the secure sandbox may present this reservation status information on a display, such as via the third interface 550. In some aspects, this reservation status may be retrieved from a network, such as via the second interface 540. In some aspects, this reservation status may only include the docking station itself, while in some other aspects the reservation status may be, for example, a reservation status of a plurality of docking stations including the docking station itself and one or more docking stations other than the docking station on which the reservation status is displayed (one or more "external" docking stations). In some aspects, an application stored in the secure sandbox may present the reservation status information by retrieving the reservation status information, processing the reservation status information by generating a user interface including the reservation status information, and presenting the user interface on the display by outputting the presented user interface to the display via the third interface 550. However, as discussed below, any appropriate type of additional and/or alternative information can be displayed on the display (e.g., via the third interface 550) by the application installed in the secure sandbox and executing on the docking station when no computing device is coupled to an example docking station. For purposes of illustration and not limitation, such additional and/or alternative information can include news, weather, notices or other status or error messages (e.g., alert or emergency notices or the like), advertising or marketing information, general or personal communications (e.g., emails, chat messages, etc.), games (e.g., demonstration or interactive), videos, images, text or any combination thereof, or any other suitable information associated with or otherwise relevant to the docking station and/or one or more external docking stations, the geographical area in which or near where the docking station is located, the user(s) using or who will be using the docking station, and the like that can be provided by an application installed in the secure sandbox.

In some aspects, applications executed in the secure sandbox may generate status or error messages for outputting to the display. For example, as discussed above, the peripheral interface 236 may couple the docking station to one or more peripherals, and the sensor interface 238 may couple the docking station to one or more sensors, such as a temperature sensor or another sensor capable of detecting environmental conditions. In some aspects, an application executing in the secure sandbox may receive third data including one or more error messages relating to a peripheral or a sensor coupled to the docking station, and process the error messages by generating a user interface containing or explaining the error messages. Some error messages may include diagnostic information alerting the user to the specific nature of the error, and the user interface may provide the diagnostic information, or in some aspects the user interface may provide additional information based on the diagnostic information. For example, in addition to or instead of including an error code associated with the error message, the user interface may translate that error code into a more human readable message indicating a source or a cause of the error. The error messages or the generated user interface may then be output to the display such as via the third interface 550. A user of the docking station may then be notified of the error and may, for example, take corrective action such as by repairing or replacing the peripheral or sensor.

In some aspects, the status message may not be an error message but an informational message. For example, sensors and peripherals may require periodic replacement or recalibration, and the status message may indicate a remaining lifetime of the peripheral or sensor, may indicate that a calibration is needed for the peripheral or sensor, may indicate a remaining time before a replacement or recalibration is required, and so on. A user of the docking station may thus be notified about the status of the peripheral or sensor and may take or plan corrective action, such as enacting or planning a replacement or recalibration.

In some aspects, an application executing in the secure sandbox may be configured to generate one or more alert messages for outputting to the display. For example, a building in which the docking station is located may have a fire or other emergency alarm system. Similarly, a geographic area in which the docking station is located may be subject to an emergency alert, such as a tornado or another weather related warning. In further aspects, security alerts may be generated for a building or locality housing the docking station, indicating the presence of a dangerous situation, the presence of an armed intruder, and so on. In the event such an alert is triggered, an alert message may be sent to the docking station. The docking station may retrieve such a message, such as via the second interface 540, and process the alert message for display by generating an interface containing the alert message and outputting the alert message or user interface to the display, such as via the third interface 550. A user may then be informed and able to take action to protect themselves, such as by leaving the building in the event of a fire alarm, by seeking shelter in the event of a tornado warning, and so on.

In further aspects, applications executing in the secure sandbox may be configured to retrieve advertising information for outputting to the display. For example, the application may retrieve the advertising information from the network via the second interface 540, process the advertising information by generating a user interface including the advertising information, and output the advertising information or the generated user interface to the display via the third interface 550. In some aspects, rather than retrieving the advertising information from the network immediately prior to display, an application may retrieve the advertising information and store it for a period of time, such as a number of hours, one day, one week, or another suitable time period. Subsequently, the stored advertising information may be output to the display.

In further aspects, applications executing in the secure sandbox may be configured to display branding information associated with an owner of the docking station. For example, a corporation may deploy a plurality of docking stations, and may wish for their corporate branding to be presented on each docking station. An application executing in the secure sandbox may generate a user interface including the corporate branding, such as one or more graphics, fonts, logos, trademarked names or phrases, etc. In some aspects, an application may retrieve branding information from the network, such as via the second interface 540, and output such branding information, or may generate a user interface including such branding information and output the user interface, to the display. In some aspects, the branding information may include reservation information about the docking station or one or more external docking stations. In some aspects, providing the branding information through a replaceable application stored in the secure sandbox may allow for the branding information to be updated and altered as the corporation changes its own branding. For example, new logos, new trademarks, new products, and so on may much more easily be displayed on the docking station through altering the application than by requiring the deployment of new firmware to the docking station.

In some aspects, execution of an application stored in the secure sandbox may output user guidance information to the display. For example, in order to aid users in coupling to the docking station, in reserving the docking station or another external docking station, and so on, executing the application may cause a user guide, such as a quick start guide, to be output to the display, instructing the user in basic interactions with the docking station.

While the applications described above are described as presenting information when no computing device is docked to the docking station—that is, when the docking station is operating in the second mode—in some aspects, applications executing in the secure sandbox may output data to the display while a computing device is coupled to the docking station via the first interface, or may output data to the display regardless of whether or not a computing device is coupled to the docking station. For example, in some aspects, applications executing in the secure sandbox may output data to be presented on the display in an overlay, presenting information on the display in an interface which obscures (fully or partially) other display data. For example, alert information, such as fire alarm alerts, weather alerts, and security alerts, may be important to provide to users regardless of whether a computing device is coupled to the docking station. Similarly, error information or calibration information may be presented regardless of whether or not a computing device is coupled to the docking station. In further aspects, additional information may be periodically provided in the overlay, such as reservation status information, advertising information, corporate branding information, and so on. Further, a user may request for information to be displayed, such as via a user input such as a keyboard command. In response, an overlay interface may be generated and output to the display, such as via the third interface 550. In some aspects, when no computing device is coupled to the docking station, the overlay interface may be presented on the display overlaying a standard interface which would otherwise be presented on the display, such as a standard interface displaying corporate branding information, advertising information, reservation information, and so on. In contrast, when a computing device is coupled to the docking station via the first interface 530, then the overlay interface may be presented on the display overlaying an interface based on the first data and the second data (that is, atop an interface which would otherwise be provided to display data from the computing device and data obtained from the network).

Further, while the above-described implementations generally involve outputting information to a display coupled to the docking station, such as by the third interface 550, in some other implementations applications installed in the secure sandbox may be configured to process information and to communicate with the network without outputting information to the display.

In some implementations, an application installed in the secure sandbox may gather information locally for provision to a remote computing device, such as a remote computing device accessible over the network. Such information may be gathered from one or more sensors or peripherals coupled to the docking station, may be retrieved from the docking station itself, and so on. For example, a docking station may be coupled to a thermometer, a hygrometer, or to one or more other sensors capable of detecting environmental conditions around the docking station, and an application may gather such information for provision to a remote computing device. Such an application could be used for adjusting a thermostat controlling the temperature of a room where the docking station is located, for identifying possible malfunctions of environmental control systems associated with the room where the docking station is located, and so on.

In another example, information about usage of the docking station or one or more peripherals coupled to the docking station may be gathered for provision to the remote computing device. For example, as discussed above, some peripherals may require recalibration, or replacement after a period of time. And so information about the usage of such peripherals may be provided to the remote computing device, without outputting data to the display, for determining when replacement or recalibration is needed. Similarly, status and error information relating to the docking station, to peripherals coupled to the docking station, or relating to applications installed in the secure sandbox may be provided to the remote computing device without outputting such information to the display. Providing such usage, calibration, status, or error message information to the remote computing device may allow for remote management of the docking station without inconveniencing the user of the docking station.

In another example, an application executing in the secure sandbox may send reservation and usage information about the docking station to a remote computing device, for example so that the remote computing device may monitor which docking stations are in use and which are available for users to reserve. Such information may be gathered and sent without outputting any information to the display. For example, such an application may process reservation data such as reservation times, missed reservations, and so on. A missed reservation may indicate that a user reserved the docking station for a period of time but did not couple a computing device to the docking station during that period of time. Such reservation data may be used by the remote computing device for monitoring docking station usage statistics.

Further, in some other implementations, applications executing in the secure sandbox may retrieve and store information in memory of the docking station without outputting data to the display. For example, as discussed above, applications may be downloaded from the network, such as from an application store, or updates to applications installed in the secure sandbox may be downloaded from the network. Additionally, advertising information which may later be presented on the display may be downloaded from the network and stored, so that the advertising information may later be presented on the display without requiring communication over the network.

FIG. 6 shows an illustrative flowchart depicting an example method 600 performed by a docking station, in accordance with some embodiments. The method 600 may be performed by the docking station 102 of FIGS. 1A-1C, the docking system 200 of FIG. 2, using a docking station including the application processor 500, or using another suitable docking station. In some aspects, the method 600 may be performed by a docking station operable in a plurality of modes, such as the docking station 102 of FIGS. 1A-1C.

In block 610, the docking station obtains first data via a first interface of the docking station and second data via a second interface of the docking station in response to operating in a first mode of the plurality of modes. The first interface is configured to couple the docking station to a computing device and the second interface is configured to communicate with a network.

In block 620, the docking station obtains third data via the second interface of the docking station, in lieu of the first interface, responsive to operating in a second mode of the plurality of modes.

In block 630, the docking station selectively outputs, to a display via a third interface of the docking station different from the first interface and the second interface, the first data and the second data in response to the docking station operating in the first mode, or the third data in response to the docking station operating in the second mode. The selectively outputting further includes determining that the computing device is not coupled to the docking station, processing the third data by an application installed in a secure sandbox of the docking station, and operating in the second mode in response to determining that the computing device is not coupled to the docking station.

In some aspects, at least one of the second data or the third data indicates a reservation status associated with the docking station.

In some aspects, the secure sandbox is configured to store one or more replaceable applications for processing the third data.

In some aspects, processing the third data in block 630 is performed by an application retrieved from the network and installed in the secure sandbox.

In some aspects, the method 600 further includes retrieving an application update via the second interface for an application installed in the secure sandbox, updating the application with the retrieved application update, wherein processing the third data in the secure sandbox includes processing the third data using the updated application.

In some aspects, the third data is availability information for one or more external docking stations different from the docking station, processing the third data in block 630 includes generating a user interface including the availability information for the one or more external docking stations, and outputting the third data to the display further includes presenting the user interface including the availability information for the one or more external docking stations.

In some aspects, the third data includes error information corresponding to a remote device coupled to the docking station.

In some aspects, the third data includes one or more advertisements. In some aspects, the one or more advertisements are retrieved via the second interface from the network and stored in the secure sandbox of the docking station.

In some aspects the third data includes one or more alerts for presentation on the display. In some aspects, the one or more alerts includes one or more emergency alerts pertaining to a building or a geographic location associated with the docking station.

In some aspects, presenting the first data and the second data in block 630 further includes processing the second data in the secure sandbox and presenting the processed second data in an overlay with the first data on the display.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method performed by a docking station operable in a plurality of modes, the method comprising:
    obtaining first data via a first interface of the docking station and second data via a second interface of the docking station, responsive to operating in a first mode of the plurality of modes, the first interface being configured to couple the docking station to a computing device and the second interface being configured to communicate with a network;
    obtaining third data via the second interface of the docking station, in lieu of the first interface, responsive to operating in a second mode of the plurality of modes; and
    selectively outputting, to a display via a third interface of the docking station different from the first interface and the second interface, the first data and the second data in response to the docking station operating in the first mode, or the third data in response to the docking station operating in the second mode, wherein the selectively outputting further comprises determining that the computing device is not coupled to the docking station, processing the third data by an application installed in a secure sandbox of the docking station, and operating in the second mode in response to determining that the computing device is not coupled to the docking station.

2. The method of claim 1, wherein at least one of the second data or the third data indicates a reservation status associated with the docking station.

3. The method of claim 1, wherein the secure sandbox is configured to store one or more replaceable applications for processing the third data.

4. The method of claim 1, wherein processing the third data is performed by the application retrieved from the network and installed in the secure sandbox.

5. The method of claim 1, further comprising:
retrieving an application update via the second interface for the application installed in the secure sandbox; and
updating the application with the retrieved application update;
wherein processing the third data in the secure sandbox comprises processing the third data using the updated application.

6. The method of claim 1, wherein:
the third data is availability information for one or more external docking stations different from the docking station;
processing the third data comprises generating a user interface including the availability information for the one or more external docking stations; and
outputting the third data to the display further comprises presenting the user interface including the availability information for the one or more external docking stations.

7. The method of claim 1, wherein the third data comprises error information corresponding to a remote device coupled to the docking station.

8. The method of claim 1, wherein the third data comprises one or more advertisements.

9. The method of claim 8, wherein the one or more advertisements are retrieved via the second interface from the network and stored in the secure sandbox of the docking station.

10. The method of claim 1, wherein the third data comprises one or more alerts for presentation on the display.

11. The method of claim 10, wherein the one or more alerts comprise one or more emergency alerts pertaining to a geographic location associated with the docking station.

12. The method of claim 1, wherein presenting the first data and the second data further comprises processing the second data by the application installed in the secure sandbox and presenting the processed second data in an overlay with the first data on the display.

13. A controller for a docking station operable in a plurality of modes, the controller comprising:
a processing system; and
a memory storing instructions that, when executed by the processing system, cause the controller to:
obtain first data via a first interface of the docking station and second data via a second interface of the docking station, responsive to operating in a first mode of the plurality of modes, the first interface being configured to couple the docking station to a computing device and the second interface being configured to communicate with a network;
obtain third data via the second interface of the docking station, in lieu of the first interface, responsive to operating in a second mode of the plurality of modes; and
selectively output, to a display via a third interface of the docking station different from the first interface and the second interface, the first data and the second data in response to the docking station operating in the first mode, or the third data in response to the docking station operating in the second mode, wherein the selectively outputting further comprises determining that the computing device is not coupled to the docking station, processing the third data by an application installed in a secure sandbox of the docking station, and operating in the second mode in response to determining that the computing device is not coupled to the docking station.

14. The controller of claim 13, wherein at least one of the second data or the third data indicates a reservation status associated with the docking station.

15. The controller of claim 13, wherein the secure sandbox is configured to store one or more replaceable applications for processing the third data.

16. The controller of claim 13, wherein execution of the instructions for processing the third data further causes the controller to process the third data using the application retrieved from the network and installed in the secure sandbox.

17. The controller of claim 13, wherein execution of the instructions further causes the controller to:
retrieve an application update via the second interface for the application installed in the secure sandbox; and
update the application with the retrieved application update;
wherein processing the third data in the secure sandbox comprises processing the third data using the updated application.

18. The controller of claim 13, wherein:
the third data is availability information for one or more external docking stations different from the docking station;
processing the third data comprises generating a user interface including the availability information for the one or more external docking stations; and
outputting the third data to the display further comprises presenting the user interface including the availability information for the one or more external docking stations.

19. The controller of claim 13, wherein the third data comprises error information corresponding to a remote device coupled to the docking station.

20. A system comprising:
a display; and
a docking station coupled to the display and operable in a plurality of modes, the docking station being configured to:
obtain first data via a first interface of the docking station and second data via a second interface of the docking station, responsive to operating in a first mode of the plurality of modes, the first interface being configured to couple the docking station to a computing device and the second interface being configured to communicate with a network;
obtain third data via the second interface of the docking station, in lieu of the first interface, responsive to operating in a second mode of the plurality of modes; and
selectively output, to a display via a third interface of the docking station different from the first interface and the second interface, the first data and the second data in response to the docking station operating in the first mode, or the third data in response to the docking station operating in the second mode, wherein the selectively outputting further comprises determining that the computing device is not coupled to the docking station, processing the third data by an application installed in a secure sandbox of the docking station, and operating in the second mode in response to determining that the computing device is not coupled to the docking station.

\* \* \* \* \*